(12) United States Patent
Chang (10) Patent No.: US 10,730,579 B2
(45) Date of Patent: Aug. 4, 2020

(54) AUTOMATICALLY FOLDABLE ELECTRIC VEHICLE

(71) Applicant: Chienti Enterprise Co., Ltd., New Taipei (TW)

(72) Inventor: Feng-Chu Chang, New Taipei (TW)

(73) Assignee: Chienti Enterprise Co., Ltd., New Taipei (TW)

( * ) Notice: Subject to any disclaimer, the term of this patent is extended or adjusted under 35 U.S.C. 154(b) by 0 days.

(21) Appl. No.: 16/411,297

(22) Filed: May 14, 2019

(65) Prior Publication Data
US 2020/0156727 A1 May 21, 2020

(30) Foreign Application Priority Data
Nov. 20, 2018 (TW) .............................. 107215738 U (51) Int. Cl.
| | |
|---|---|
| *B62K 15/00* | (2006.01) |
| *B62J 1/08* | (2006.01) |
| *B62K 5/01* | (2013.01) |
| *B62K 21/12* | (2006.01) |
| *B62J 1/28* | (2006.01) |

(52) U.S. Cl.
CPC .............. *B62K 15/006* (2013.01); *B62J 1/08* (2013.01); *B62K 5/01* (2013.01); *B62J 1/28* (2013.01); *B62K 21/12* (2013.01); *B62K 2015/005* (2013.01)

(58) Field of Classification Search
CPC ................ B62K 15/006; B62K 15/008; B62K 2015/005; B62K 5/003; B62K 5/007; B62J 1/08
See application file for complete search history.

(56) References Cited

U.S. PATENT DOCUMENTS

| | | | | |
|---|---|---|---|---|
| 7,125,080 B1* | 10/2006 | Jarema, III | .......... | B60N 2/3011 297/411.32 |
| 9,533,729 B1* | 1/2017 | Chan | .................... | B62K 15/008 |
| 10,562,583 B1* | 2/2020 | Chan | ........................ | B62K 5/06 |
| 2003/0141121 A1* | 7/2003 | Flowers | ................. | A61G 5/045 180/65.1 |
| 2005/0077097 A1* | 4/2005 | Kosco | .................... | B62K 5/025 180/208 |
| 2015/0061263 A1* | 3/2015 | Cheng | ...................... | B62B 3/02 280/641 |
| 2016/0089285 A1* | 3/2016 | Cheng | .................... | B62K 5/007 180/58 |

(Continued)

*Primary Examiner* — Brian L Swenson
(74) *Attorney, Agent, or Firm* — Alan D. Kamrath; Mayer & Williams PC (57) ABSTRACT

An electric vehicle includes a front frame (1), a rear frame (2), and a sliding seat (3). The front frame has a first gear set (14). A movable rotation shaft (15) connects the front frame and the rear frame. The rear frame has a track (21). A sliding support (22) is mounted on the track and connects a linear driver (23) which connects a connecting member (25) which connects a connecting shaft (26) which connects the front frame. A wheel support (27) connects the rear frame and an auxiliary wheel (28) and has a second gear set (29) meshing with the first gear set. A linkage (4) connects the rear frame and support rack (31). A link unit (41) connects the linkage and the sliding support. The sliding seat is mounted on a seat support (33) which is mounted on the support rack.

5 Claims, 10 Drawing Sheets

(56) References Cited

U.S. PATENT DOCUMENTS

2018/0162480 A1\* 6/2018 Zhang .................... B62K 3/002
2019/0168837 A1\* 6/2019 Zhang .................... B62K 21/16
2019/0283831 A1\* 9/2019 Zhang ...................... B62K 5/08

\* cited by examiner

AUTOMATICALLY FOLDABLE ELECTRIC VEHICLE

BACKGROUND OF THE INVENTION

1. Field of the Invention

The present invention relates to a transport vehicle and, more particularly, to an electric vehicle, such as an electromobile, an electromobile, an electric scooter or the like.

2. Description of the Related Art

A conventional electric vehicle does not have a folding function. A conventional foldable electric vehicle is folded partially, such that the folded electric vehicle still needs a large storage space. In addition, the foldable electric vehicle is not folded automatically, thereby causing inconvenience to the user in folding of the foldable electric vehicle.

BRIEF SUMMARY OF THE INVENTION

The primary objective of the present invention is to provide an electric vehicle that is folded and unfolded automatically to facilitate the user folding and unfolding the electric vehicle.

In accordance with the present invention, there is provided an electric vehicle comprising a front frame, a rear frame connected with the front frame, a sliding seat connected with the rear frame, an electromagnetic valve and pin module mounted on the rear frame, and a removable ornament board mounted between the front frame and the rear frame. The front frame has a front end provided with a set of front wheels, a handle support and a steering handle. The front frame has a rear end provided with a first gear set. A movable rotation shaft is connected with the rear end of the front frame and connected with the rear frame. The rear frame has a rear end provided with a set of rear wheels. The rear frame is provided with a track. A sliding support is movably mounted on the track. A linear driver is connected with the sliding support. The linear driver has a front end provided with a driver holder. The driver holder is connected with a connecting member. The connecting member is connected with a connecting shaft. The connecting shaft is connected with the front frame. A wheel support is pivotally connected with a front end of the rear frame and is to movable upward and downward. An auxiliary wheel is mounted on the wheel support. The wheel support is provided with a second gear set meshing with the first gear set of the front frame. A linkage has a first end pivotally connected with the rear frame. A link unit has a first end pivotally connected with the linkage and a first end pivotally connected with the sliding support. A support rack is pivotally connected with a second end of the linkage. A seat support is movably mounted on the support rack. The seat support is releasably locked on the support rack by a positioning knob. The sliding seat is mounted on the seat support.

Further benefits and advantages of the present invention will become apparent after a careful reading of the detailed description with appropriate reference to the accompanying drawings.

DETAILED DESCRIPTION OF THE INVENTION

Referring to the drawings and initially to FIGS. 1-8, an electric vehicle in accordance with the preferred embodiment of the present invention comprises a front frame 1, a rear frame 2 connected with the front frame 1, a sliding seat (or chair) 3 connected with the rear frame 2, an electromagnetic valve and pin module 7 mounted on the rear frame 2, and a removable ornament board 8 mounted between the front frame 1 and the rear frame 2.

The front frame 1 has a front end provided with a set of front wheels 11, a handle support 12 and a steering handle 13. The front frame 1 has a rear end provided with a first gear set 14. A movable rotation shaft 15 is connected with the rear end of the front frame 1 and connected with the rear frame 2.

The rear frame 2 has a rear end provided with a set of rear wheels 5. The rear frame 2 is provided with a track 21. A sliding support 22 is movably mounted on the track 21. A linear driver (or actuator) 23 is connected with the sliding support 22. The linear driver 23 has a front end provided with a driver holder 24. The driver holder 24 is connected with a connecting member 25. The connecting member 25 is connected with a connecting shaft 26. The connecting shaft 26 is connected with the front frame 1. A wheel support 27 is pivotally connected with a front end of the rear frame 2 and is movable upward and downward. An auxiliary wheel 28 is mounted on the wheel support 27 to move in concert with the wheel support 27. The wheel support 27 is provided with a second gear set 29 meshing with the first gear set 14 of the front frame 1.

A linkage 4 has a first end pivotally connected with the rear frame 2. A link unit 41 has a first end pivotally connected with the linkage 4 and a first end pivotally connected with the sliding support 22. A support rack (or bracket) 31 is pivotally connected with a second end of the linkage 4. A seat support 33 is movably mounted on the support rack 31. The seat support 33 is releasably locked on the support rack 31 by a positioning knob 34. The sliding seat 3 is mounted on the seat support 33.

In the preferred embodiment of the present invention, the connecting shaft 26 is connected with the movable rotation shaft 15.

In the preferred embodiment of the present invention, the linkage 4 includes four links.

In the preferred embodiment of the present invention, the positioning knob 34 extends through the seat support 33 and the support rack 31. Preferably, the positioning knob 34 is movably mounted on the seat support 33 and is retractably locked onto the support rack 31.

In the preferred embodiment of the present invention, the support rack 31 is provided with two slideways 32, and the seat support 33 has two sides slidable in the two slideways 32 of the support rack 31.

In the preferred embodiment of the present invention, the rear end of the rear frame 2 is provided with a motor 6.

In the preferred embodiment of the present invention, the link unit 41 includes two links or linking levers.

In the preferred embodiment of the present invention, the electromagnetic valve and pin module 7 is mounted on a bottom of the rear frame 2 and releasably position the sliding support 22 on the track 21. The sliding support 22 is provided with two positioning holes 71, and the electromagnetic valve and pin module 7 includes two pins extending through the track 21 and inserted into the two positioning holes 71. An automatically folding button (not shown) and an automatically unfolding button (not shown) are mounted on the rear frame 2 (or the front frame 1) to turn on/off and control operation of the electromagnetic valve and pin module 7. The structure and operation of the automatically folding button are conventional and will not be further described in detail.

In the preferred embodiment of the present invention, the removable ornament board 8 is mounted on a connection of the front frame 1 and the rear frame 2 to cover a connecting gap between the front frame 1 and the rear frame 2.

In the preferred embodiment of the present invention, the sliding seat 3 is collapsible.

Figure 1:
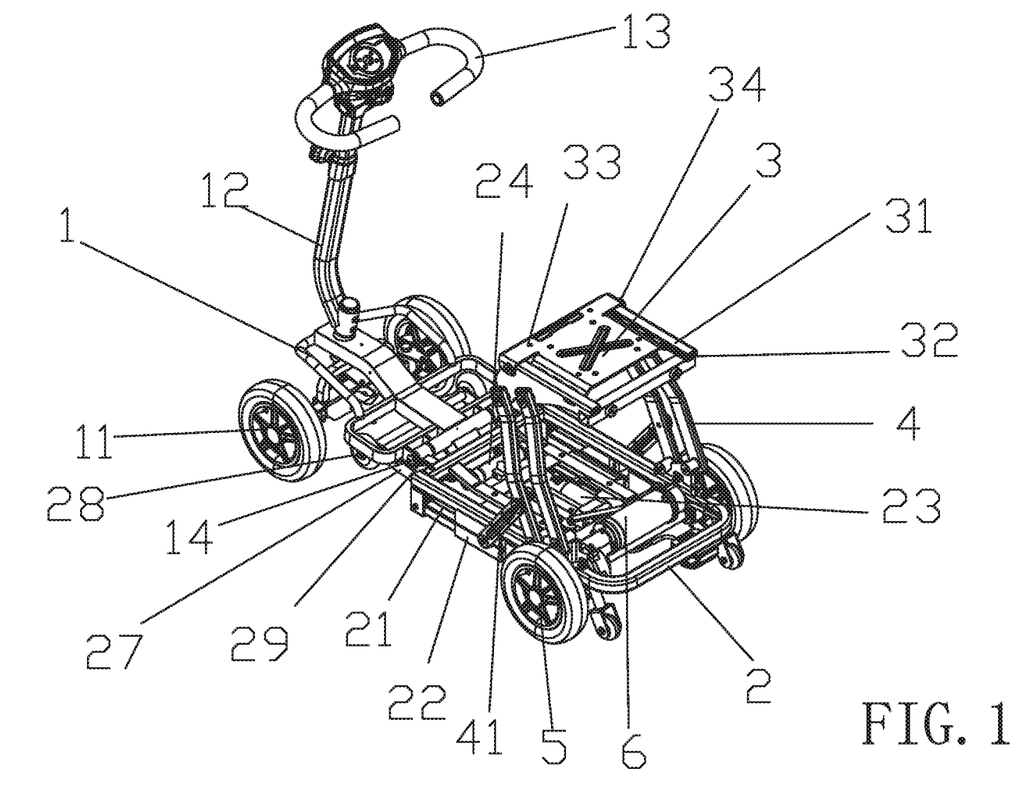
FIG. 1 is a perspective view of an electric vehicle in accordance with the preferred embodiment of the present invention.
Figure 2:
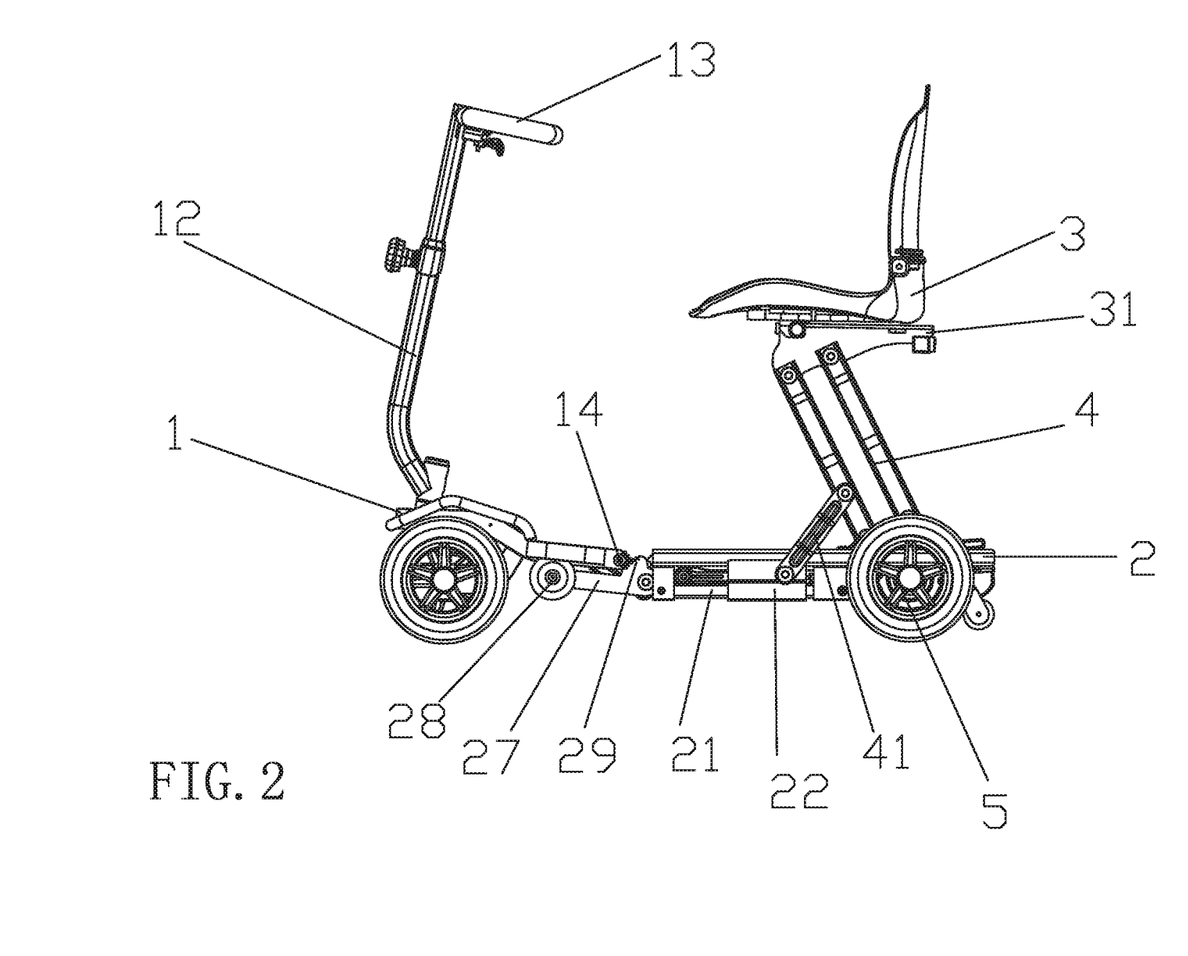
FIG. 2 is a side view of the electric vehicle as shown in FIG. 1.
Figure 3:
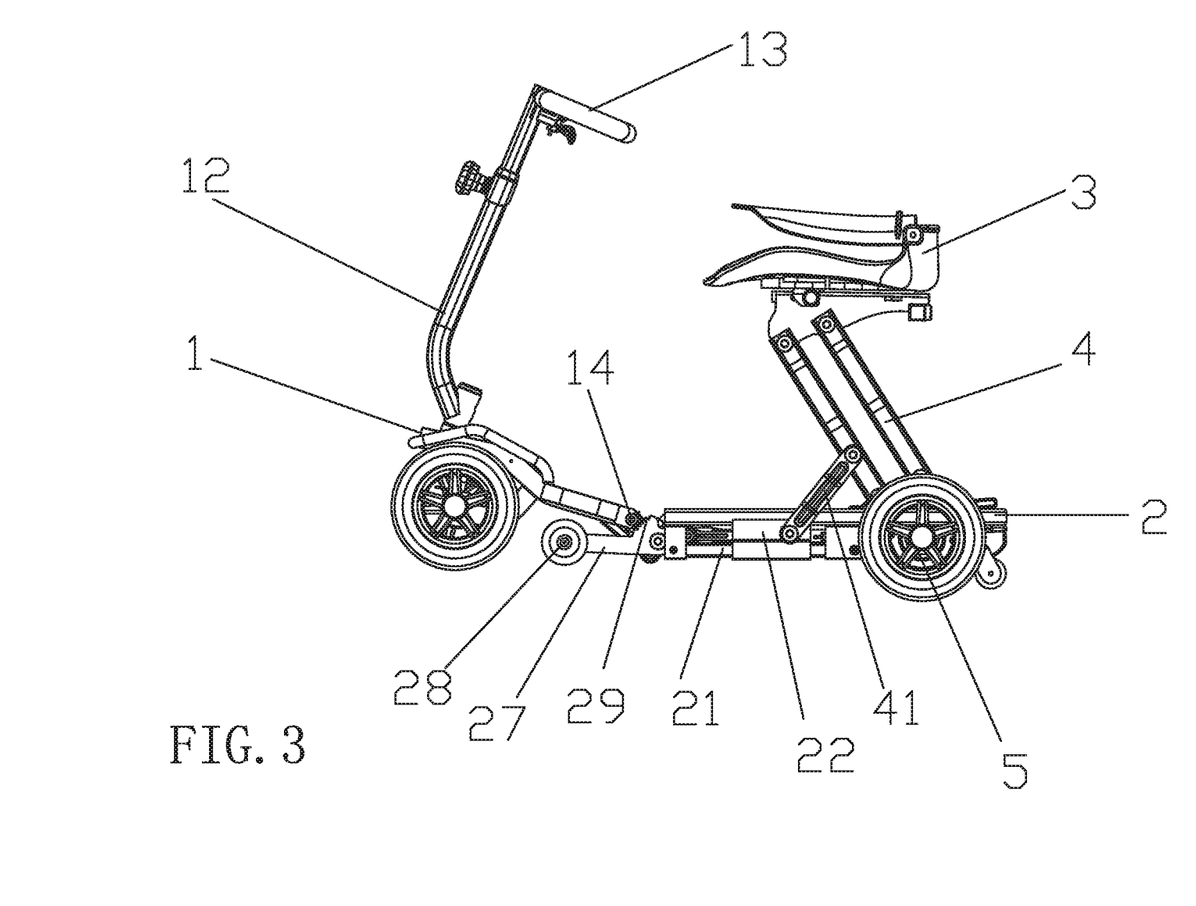
FIG. 3 is a partial folded view of the electric vehicle as shown in FIG. 2.
Figure 4:
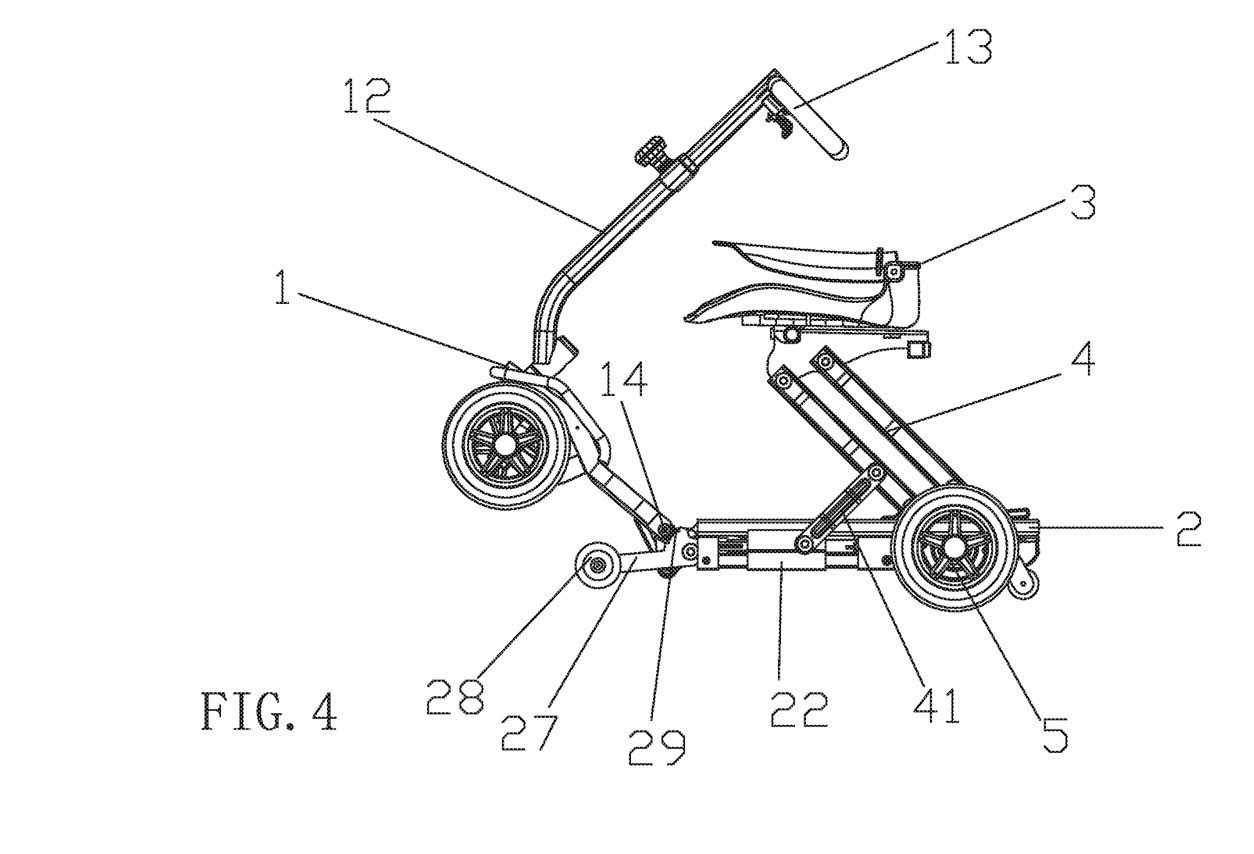
FIG. 4 is a partial folded view of the electric vehicle as shown in FIG. 3.
Figure 5:
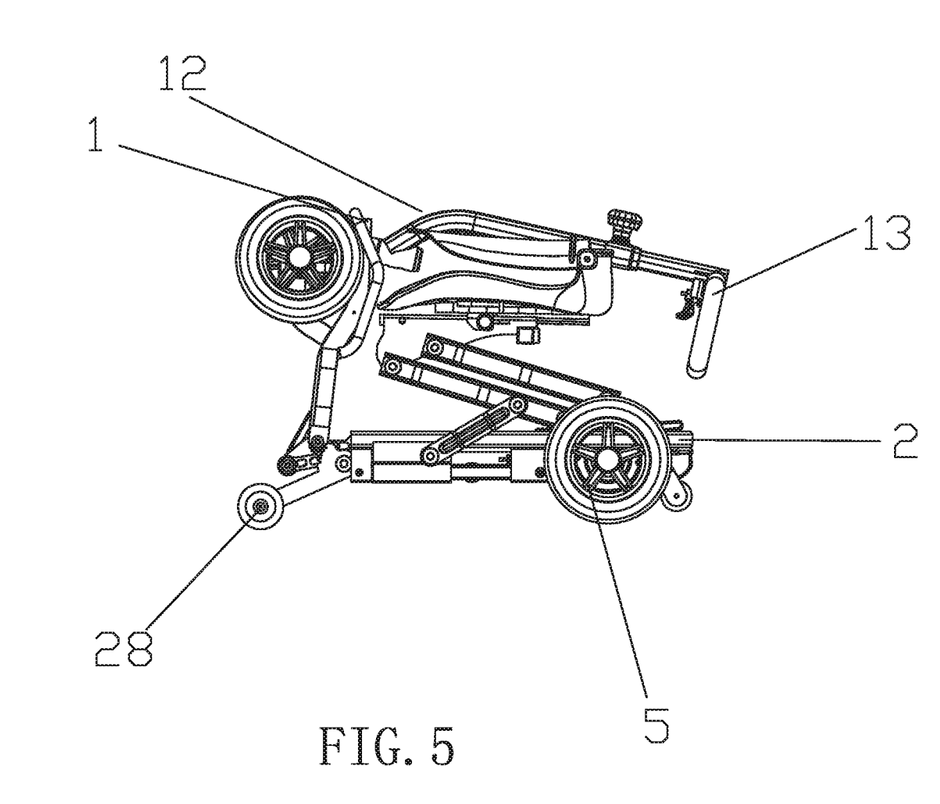
FIG. 5 is a folded view of the electric vehicle in accordance with the preferred embodiment of the present invention.
Figure 6:
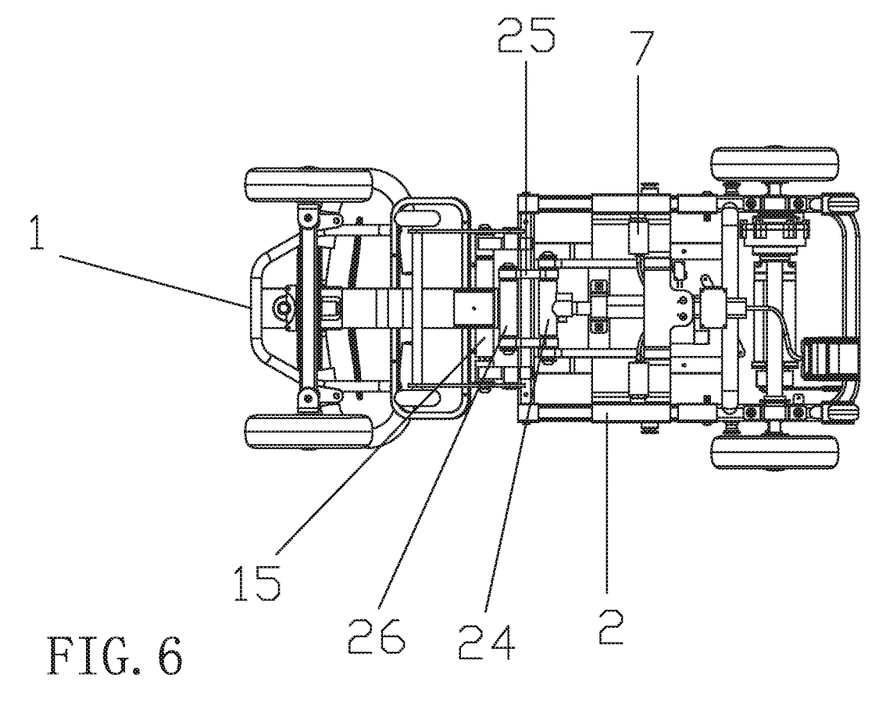
FIG. 6 is a bottom view of the electric vehicle as shown in FIG. 1.
Figure 7:
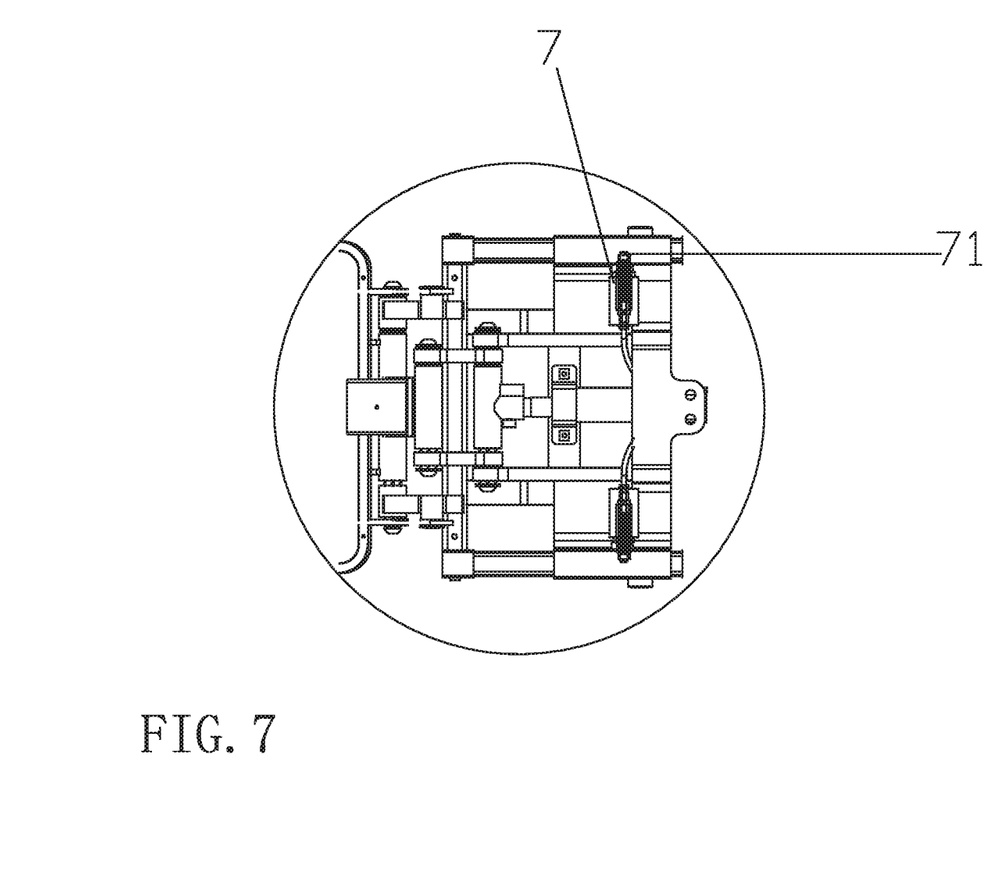
FIG. 7 is a locally enlarged view of the electric vehicle as shown in
FIG. 6.
Figure 8:
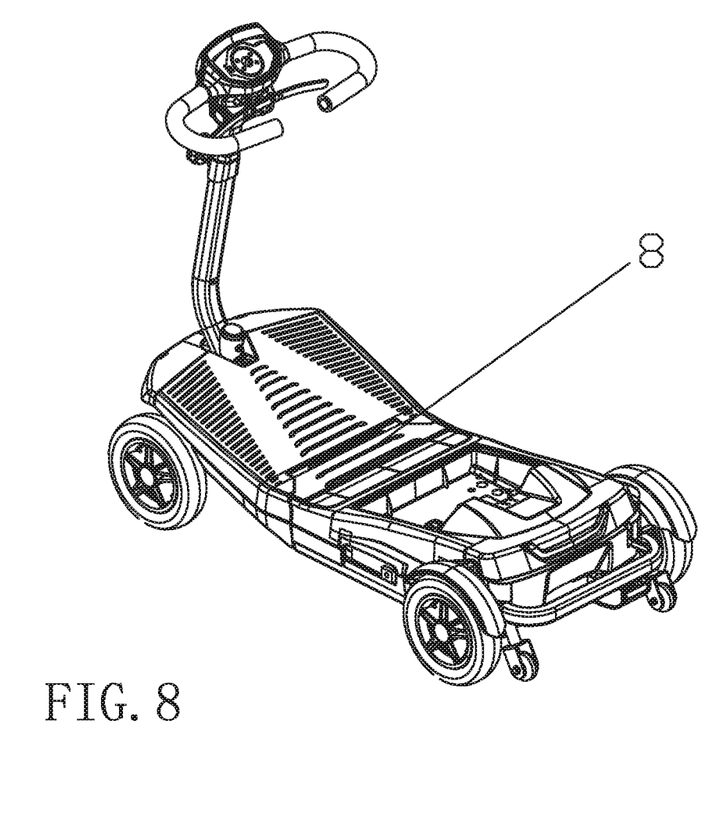
FIG. 8 is another perspective view of the electric vehicle in accordance with the preferred embodiment of the present invention.
Figure 9:
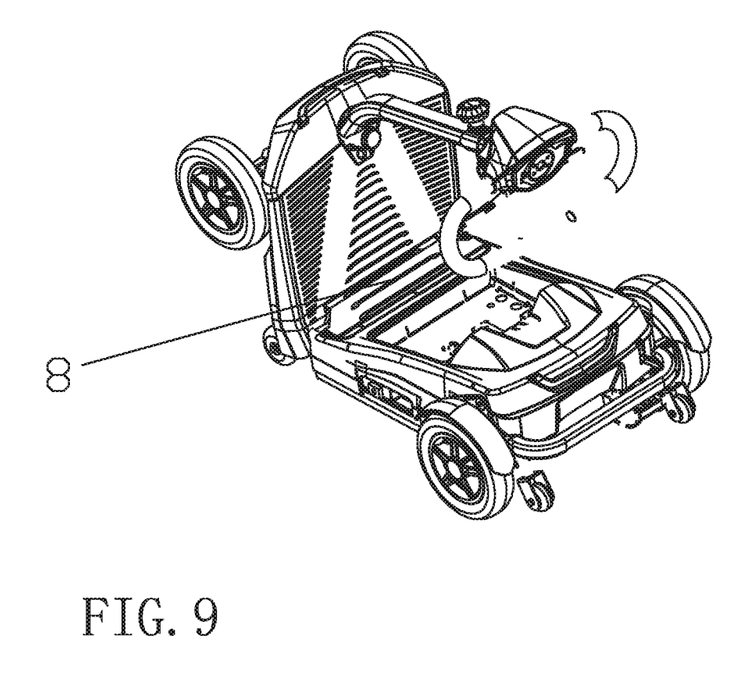
FIG. 9 is a partial folded view of the electric vehicle as shown in FIG. 8.
Figure 10:
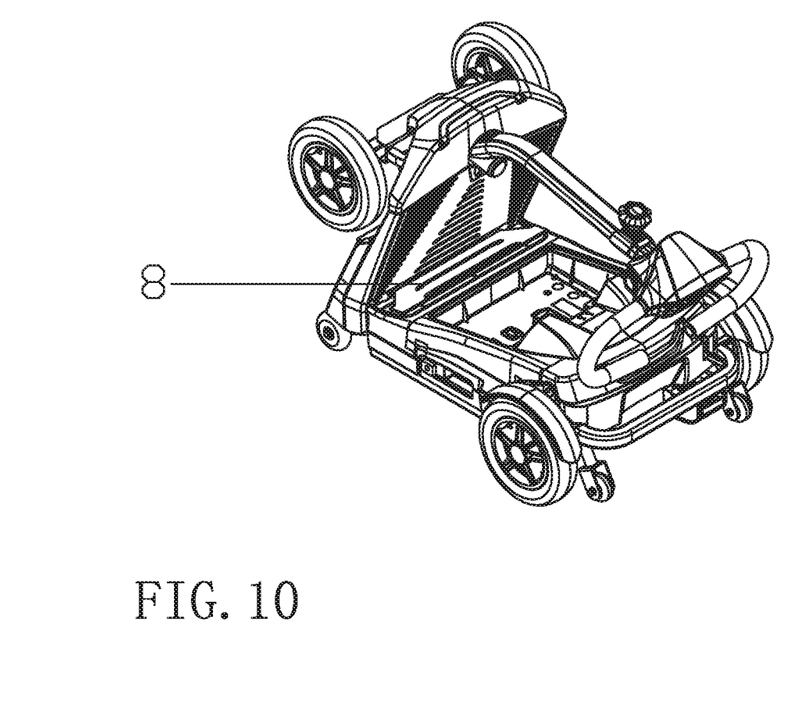
FIG. 10 is a partial folded view of the electric vehicle as shown in FIG. 9.

In folding of the electric vehicle, referring to FIGS. 1-10, the backrest of the sliding seat 3 is folded such that the sliding seat 3 is disposed horizontally. Then, the positioning knob 34 is pulled outward to unlock the seat support 33 from the support rack 31, such that the seat support 33 slides along the two slideways 32 of the support rack 31, and the sliding seat 3 is moved backward by the seat support 33. Then, after the automatically folding button is pressed, the two pins of the electromagnetic valve and pin module 7 are retracted inward and detached from the two positioning holes 71 to unlock the sliding support 22, such that the sliding support 22 is moved freely. Then, the linear driver 23 is started by the motor 6 and drives and pushes the sliding support 22, such that the sliding support 22 is moved forward along the track 21. In such a manner, the sliding support 22 drives the link unit 41 which drives the linkage 4 which drives the support rack 31 which drives the sliding seat 3, such that the sliding seat 3 is gradually moved downward and folded as shown in FIGS. 3-5, to reduce the distance between the sliding seat 3 and the rear frame 2. At the same time, the linear driver 23 also drives and pushes the driver holder 24 which drives and pushes the connecting member 25 which drives and pushes the connecting shaft 26 which drives and pushes the movable rotation shaft 15 which drives the front frame 1, such that the front frame 1 is slowly moved upward and backward relative to the rear frame 2 as shown in FIGS. 3-5, until the handle support 12 rests on and presses the sliding seat 3 as shown in FIG. 5. Thus, the electric vehicle is folded. In addition, the removable ornament board 8 is folded automatically as shown in FIGS. 8-10 during the folding process of the electric vehicle. At this time, the second gear set 29 of the wheel support 27 meshes with the first gear set 14 of the front frame 1, such that when the front frame 1 is pivoted relative to the rear frame 2, the first gear set 14 is rotated by the front frame 1, and the second gear set 29 is rotated by the first gear set 14, such that the wheel support 27 is driven by the second gear set 29 and is pivoted and moved downward relative to the rear frame 2, and the auxiliary wheel 28 is moved downward by the wheel support 27 until the auxiliary wheel 28 touches the ground. Thus, the auxiliary wheel 28 and the rear wheels 5 support the electric vehicle when the electric vehicle is folded. When the electric vehicle stands up and is disposed at an upright state, the front wheels 11 and the auxiliary wheel 28 support the electric vehicle so as to reduce the storage space of the electric vehicle.

On the contrary, after the automatically unfolding button is pressed, the abovementioned procedures are reversed so as to unfold the electric vehicle automatically.

Accordingly, the electric vehicle is folded and unfolded automatically to facilitate the user folding and unfolding the electric vehicle. In addition, the electric vehicle is folded to reduce the storage space largely. Further, the front wheels 11 and the auxiliary wheel 28 are moved when the electric vehicle is folded to facilitate the user moving the electric vehicle that is folded. Further, the user only needs to start the linear driver 23 so as to fold the sliding seat 3 and the front frame 1 simultaneously.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. An electric vehicle comprising:
    a front frame (1);
    a rear frame (2) connected with the front frame;
    a sliding seat (3) connected with the rear frame;
    an electromagnetic valve and pin module (7) mounted on the rear frame; and
    a removable ornament board (8) mounted between the front frame and the rear frame;
    wherein:
    the front frame has a front end provided with a set of front wheels (11), a handle support (12) and a steering handle (13);
    the front frame has a rear end provided with a first gear set (14);
    a movable rotation shaft (15) is connected with the rear end of the front frame and connected with the rear frame;
    the rear frame has a rear end provided with a set of rear wheels (5);
    the rear frame is provided with a track (21);
    a sliding support (22) is movably mounted on the track;
    a linear driver (23) is connected with the sliding support;
    the linear driver has a front end provided with a driver holder (24);
    the driver holder is connected with a connecting member (25);
    the connecting member is connected with a connecting shaft (26);
    the connecting shaft is connected with the front frame;
    a wheel support (27) is pivotally connected with a front end of the rear frame and is movable upward and downward;
    an auxiliary wheel (28) is mounted on the wheel support;

the wheel support is provided with a second gear set (29) meshing with the first gear set of the front frame;

a linkage (4) has a first end pivotally connected with the rear frame;

a link unit (41) has a first end pivotally connected with the linkage and a first end pivotally connected with the sliding support;

a support rack (31) is pivotally connected with a second end of the linkage;

a seat support (33) is movably mounted on the support rack;

the seat support is releasably locked on the support rack by a positioning knob (34);

the sliding seat is mounted on the seat support.

2. The electric vehicle of claim 1, wherein the support rack is provided with two slideways (32), and the seat support has two sides slidable in the two slideways of the support rack.

3. The electric vehicle of claim 1, wherein the electromagnetic valve and pin module is mounted on a bottom of the rear frame and releasably position the sliding support on the track.

4. The electric vehicle of claim 1, wherein the linkage includes four links.

5. The electric vehicle of claim 1, wherein the removable ornament board is mounted on a connection of the front frame and the rear frame to cover a connecting gap between the front frame and the rear frame.

* * * * *